United States Patent
Konrad et al.

(10) Patent No.: US 7,384,684 B2
(45) Date of Patent: Jun. 10, 2008

(54) POLYESTER FILM WITH HYDROPHILIC COATING, PROCESS FOR ITS PRODUCTION AND ITS USE

(75) Inventors: Matthias Konrad, Hofheim (DE); Dagmar Klein, Mainz (DE); Herbert Peiffer, Mainz (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 204 days.

(21) Appl. No.: 11/243,373

(22) Filed: Oct. 4, 2005

(65) Prior Publication Data

US 2006/0078718 A1 Apr. 13, 2006

(30) Foreign Application Priority Data

Oct. 12, 2004 (DE) .................. 10 2004 049 609

(51) Int. Cl.
*B32B 27/08* (2006.01)
*B32B 27/18* (2006.01)
*B32B 27/30* (2006.01)
*B32B 27/36* (2006.01)
*B32B 27/40* (2006.01)

(52) U.S. Cl. ............... 428/215; 428/212; 428/213; 428/216; 428/423.1; 428/423.7; 428/480; 428/483; 428/500; 428/522; 525/55; 525/123; 525/165; 525/175; 525/176; 525/222; 525/230; 525/231; 525/232; 525/233; 427/314; 427/322; 427/533; 427/384; 427/385.5; 427/393.5

(58) Field of Classification Search ............... None
See application file for complete search history.

(56) References Cited

U.S. PATENT DOCUMENTS

| | | | | |
|---|---|---|---|---|
| 3,988,157 A | * | 10/1976 | Van Paesschen et al. | ... 430/535 |
| 4,100,309 A | * | 7/1978 | Micklus et al. | ............ 427/2.28 |
| 4,119,094 A | * | 10/1978 | Micklus et al. | ............ 128/844 |
| 4,252,885 A | | 2/1981 | McGrail et al. | ............ 430/160 |
| 4,467,073 A | | 8/1984 | Creasy | ............ 525/127 |
| 4,729,914 A | * | 3/1988 | Kliment et al. | ............ 428/35.7 |
| 4,835,003 A | * | 5/1989 | Becker et al. | ............ 427/2.28 |
| 4,990,357 A | * | 2/1991 | Karakelle et al. | ............ 427/2.12 |
| 5,001,009 A | * | 3/1991 | Whitbourne | ............ 428/412 |
| 5,262,224 A | * | 11/1993 | Ozaki et al. | ............ 428/195.1 |
| 5,262,475 A | | 11/1993 | Creasy | ............ 525/58 |
| 5,391,429 A | * | 2/1995 | Otani et al. | ............ 428/327 |
| 5,607,897 A | * | 3/1997 | Masuda | ............ 503/227 |
| 5,621,058 A | * | 4/1997 | Kondo et al. | ............ 526/264 |
| 5,645,855 A | * | 7/1997 | Lorenz | ............ 424/449 |
| 5,985,437 A | * | 11/1999 | Chappell et al. | ............ 428/336 |
| 5,997,517 A | * | 12/1999 | Whitbourne | ............ 604/265 |
| 6,165,602 A | * | 12/2000 | Fujita | ............ 428/216 |
| 6,403,224 B1 | * | 6/2002 | Okajima et al. | ............ 428/423.7 |
| 6,455,142 B1 | * | 9/2002 | Heberger et al. | ............ 428/215 |
| 6,485,804 B1 | * | 11/2002 | Nakamachi et al. | ............ 428/35.7 |
| 6,589,649 B2 | * | 7/2003 | Oya et al. | ............ 428/343 |
| 6,645,615 B2 | * | 11/2003 | Heberger et al. | ............ 428/336 |
| 6,706,836 B1 | * | 3/2004 | Holguin et al. | ............ 526/320 |
| 6,828,010 B2 | * | 12/2004 | Kubota et al. | ............ 428/213 |
| 7,008,979 B2 | * | 3/2006 | Schottman et al. | ............ 523/334 |
| 2003/0124338 A1 | * | 7/2003 | Inagaki et al. | ............ 428/317.9 |
| 2004/0065578 A1 | | 4/2004 | Bone et al. | ............ 206/524.1 |
| 2007/0087188 A1 | * | 4/2007 | Konrad et al. | ............ 428/336 |

FOREIGN PATENT DOCUMENTS

| | | |
|---|---|---|
| EP | 0 144 878 A2 | 6/1985 |
| EP | 0 296 620 A2 | 12/1988 |
| EP | 0 848 286 A1 | 6/1998 |
| WO | WO 94/13476 A1 | 6/1994 |
| WO | WO 02/074535 A1 | 9/2002 |

OTHER PUBLICATIONS

Schimtz, Peter et al., "Films." Ullmann's Encyclopedia of Industrial Chemistry, 5th Ed., vol. A11 (1988), pp. 85-95, 105-106, 108-110.*

* cited by examiner

*Primary Examiner*—Vivian Chen
(74) *Attorney, Agent, or Firm*—ProPat, L.L.C.

(57) ABSTRACT

The invention relates to an aqueous coating composition which comprises a mixture of polyvinylpyrrolidone, a surfactant and optionally an adhesion-promoting polymer. This mixture is suitable for inline coating of biaxially oriented polyester films. The thus obtained films feature a characteristic hydrophilic surface which prevents the fogging of the films with water droplets.

25 Claims, No Drawings

POLYESTER FILM WITH HYDROPHILIC COATING, PROCESS FOR ITS PRODUCTION AND ITS USE

CROSS-REFERENCE TO RELATED APPLICATIONS

This application claims priority to parent German Patent Application No. 10 2004 049 609.9, filed Oct. 12, 2004, hereby incorporated by reference herein in its entirety.

FIELD OF THE INVENTION

The invention relates to an aqueous coating composition which comprises polyvinylpyrrolidone, a surfactant and optionally an adhesion-promoting polymer. This composition is suitable for inline coating of biaxially oriented polyester films. The thus obtained coated films feature a characteristic hydrophilic surface which prevents the fogging of the film with water droplets (known as antifog coating).

BACKGROUND OF THE INVENTION

The packaging industry has a high demand for transparent biaxially oriented polyester films. When fresh, easily perishable foodstuffs are packaged with polyester film, the result can be, particularly in the case of chilled products, undesired fogging of the film and thus deterioration of the transparency when moisture condenses out of the packaged products onto the film in the form of drops, usually of different size. The transparency of the film is distinctly worsened by the condensate. The reduction of the transparency of the film can be prevented by a hydrophilic coating, also known as an antifog coating.

Another sector in which hydrophilization of the film is required is that of medical applications. In the case of diagnosis rods made of polyester film, the applied liquid, for example blood, has to be distributed rapidly and uniformly over the surface. This can be achieved with a hydrophilic coating.

Antifog properties of plastics surfaces can be realized by means of two different technologies. Firstly, the addition of an additive into the polymer is conceivable; secondly, an antifog coating can be applied to the film. The addition of an additive into the polymer is possible in the case of polyolefin articles, in particular films (for example WO2002/074535). The antifog action on the film surface is based on the migration of the additive, usually an amphiphilic molecule, to the surface, so that the polar ends of the molecules form the actual antifog layer. A transfer of this principle to a polyester film is not possible, owing to the high polarity of the polyester.

Also known are coatings based on hydrophilic water-soluble polymers. However, a problem in this context is the ease with which the coating is washed out, which can be prevented by additives which lead to crosslinking of the polymer. Surfactants are also used for antifog coatings, since they lower the surface tension of the water. However, these known coatings are applied to an existing film surface, i.e. the production of the substrate and the coating are effected in two steps. It would be desirable to apply such coatings to the polyester films actually within the production process thereof (in what is known as the inline process); however, such coatings are to date not known.

U.S. Pat. No. 4,467,073 discloses a transparent antifog coating. The composition comprises a) polyvinylpyrrolidone, polydimethylacrylamide or a polyvinylpyrrolidone copolymer with an α-olefin, b) a polyisocyanate prepolymer, c) a surfactant and d) an organic solvent. The disadvantage of this invention is the use of an organic solvent, especially when the coating step is to be incorporated into the film production (inline). In addition, the use of an isocyanate in foodstuff packaging is controversial, since carcinogenic primary amines can form.

U.S. Pat. No. 5,262,475 describes a hydrophilic composition which comprises polyvinylpyrrolidone, polyvinyl alcohol and, as a crosslinker, melamine, a mineral acid or a strong organic acid. In addition, the coating solution may comprise additives such as chain extenders, foam regulators or surfactants. The solids content of the coating is from 5 to 50%. The crosslinking to hard clear layers requires temperatures of at least 75° C.; in the examples, temperatures between 130 and 150° C. are used. This makes these coatings unsuitable for inline application to polyester films, since the components crosslink as early as in the course of drying or in the course of stretching, and the coating thus starts to tear and therefore can lead to tears in the film. The fact that the crosslinked coatings are described as hard also suggests that they are unsuitable for use on flexible substrates.

It is an object of the present invention to provide a hydrophilic coating composition which can be applied inline during the production of biaxially oriented polyester films, i.e. before the second stretching step. The thus obtained coated polyester films should have good antifog effect, high washout resistance and high hydrophilicity.

According to the invention, the object is achieved by the provision of an aqueous coating composition which, in addition to water, comprises the following components:

a) polyvinylpyrrolidone,
b) a surfactant and optionally
c) a polymer which improves the binding of the polyvinylpyrrolidone to the polyester surface.

The total concentration of all components a) to c) in water is preferably in the range from 1 to 8% by weight. Unless stated otherwise, all amounts specified are percentages by weight.

The polyvinylpyrrolidone is used preferably with a molecular weight (Mw) between 20 and 2500 kdaltons, more preferably between 40 and 1500 kdaltons. The proportion of the polyvinylpyrrolidone in the coating solution is from 0.3 to 4.0% by weight, preferably from 0.5 to 3.5% by weight. When polyvinylpyrrolidone having lower molecular weights is used, the washout resistance of the coating becomes poorer; at higher molecular weights, the coating solution becomes too viscous.

Surfactants refer to molecules which consist of a hydrophobic and a hydrophilic part; they are referred to as amphiphilic.

The surfactant mentioned in the above-described coating composition is used in a concentration of from 0.1 to 2.5% by weight, preferably from 0.3 to 2.0% by weight, and is preferably an ionic, more preferably an anionic surfactant, and is more preferably selected from the group of the alkylsulfates, alkylbenzenesulfates, alkyl ether sulfates or sulfosuccinic esters.

The polymers which improve the binding of the polyvinylpyrrolidone to the polyester surface are used preferably in the form of an aqueous solution or dispersion. The concentration in the finished coating solution is from 0.3 to 4.0% by weight, preferably from 0.5 to 3.5% by weight. Suitable polymers of this type are acrylates, as described, for example, in WO94/13476, hydrophilic polyesters (5-Nasulfoisophthalic acid-containing PET/IPA polyester, as described, for example, in EP-A-0144878, U.S. Pat. No. 4,252,885 or EP-A-0296620; dendritic polyesters having alcohol or acid end groups), polyurethanes, butadiene copolymers with acrylonitrile or methyl methacrylate, methacrylic acid or esters thereof.

The acrylates preferably comprise an ester of methacrylic zacid, in particular an alkyl ester whose alkyl group contains up to ten carbon atoms, for example the methyl, ethyl, n-propyl, isopropyl, n-butyl, isobutyl, tertiary butyl, hexyl, 2-ethyhexyl, heptyl and n-octyl group. Acrylic copolymers which are derived from a lower alkyl acrylate (C1 to C4), in particular ethyl acrylate, together with a lower alkyl methacrylate give rise to particularly good adhesion to the polyester film. In addition, preference is given to using suitable comonomers, for example N-methylolacrylamide, N-methylolmethacrylamide and the corresponding ethers; carboxyl-containing monomers, for example crotonic acid, itaconic acid, maleic acid or acrylic acid; anhydrides, for example maleic anhydride or itaconic anhydride; hydroxyl-containing monomers, for example allyl alcohol and hydroxyethyl or hydroxypropyl acrylate or methacrylate, and amides, for example acrylamide, methacrylamide or maleamide. Such acrylate copolymers give rise to particularly good adhesion between the polyester film and the polyvinylpyrrolidone.

Optionally, the coating may comprise antiblocking agents. Customary antiblocking agents are inorganic and/or organic particles, for example calcium carbonate, amorphous silica, talc, magnesium carbonate, barium carbonate, calcium sulfate, barium sulfate, lithium phosphate, calcium phosphate, magnesium phosphate, alumina, lithium fluoride, titanium dioxide, kaolin or crosslinked polystyrene or acrylate particles. Preference is given to porous $SiO_2$ such as amorphous silica, since this promotes the distribution of water over the surface of the film.

The coating composition thus contains preferably only water and components a) and b), or a), b) and c), and also optionally antiblocking agents. "Contains" means here that the composition comprises to an extent of at least 90% by weight, preferably at least 95% by weight and more preferably at least 99% by weight, of the aforementioned substances.

After the inline coating, the coating comprises of the dried residue (drying product) of the coating composition, which then likewise preferably contains only of the drying product of components a) and b), or a), b) and c), and also optionally antiblocking agents.

The inventive coating may be used in order to coat biaxially oriented polyester film inline, i.e. the coating is applied during the film production process before the longitudinal and/or transverse stretching. In order to achieve good wetting of the polyester film with the aqueous solution, the surface is preferably initially corona-treated. The coating can be applied with a common suitable process, such as with a slot coater or a spray process. Particular preference is given to applying the coating by means of the reverse gravure-roll coating process, in which the coating can be applied extremely homogeneously with application weights between 1.0 and 3.0 $g/m^2$. Preference is likewise given to application by the Meyer Rod process, with which larger coating thicknesses can be achieved. The coating on the finished film has a thickness of from 5 to 500 nm, preferably from 30 to 200 nm.

The coating components can react with one another during the drying and orientation of the polyester film and particularly in the subsequent heat treatment, which can extend up to 240° C. The reaction product affords, especially on a biaxially oriented polyester film, good antifog effect, high washout resistance and high hydrophilicity.

The polyester film to which the coating is applied can have a single-layer structure, a two-layer structure comprised of a base layer (B) and an outer layer (A), or a three-layer structure comprised of a base layer (B) and two outer layers (A) and (A' or C).

The total thickness of the polyester film is typically in the range from 5 to 500 µm, preferably from 10 to 350 µm.

The polyester film may be transparent, white, opaque, glossy or matt. These different optical properties are achieved, for example, by the addition of different amounts of additives such as calcium carbonate, amorphous silica or titanium dioxide. These additives may be present both in the base layer and in any outer layers present.

In addition, the polyester film may be sealable and peelable. This is commonly achieved by use of polyesters with low glass transition temperature or of other sealable polymers in at least one outer layer.

The polyester film is comprised mainly of thermoplastic polyester. Such polyesters are specified in the "Handbook of Thermoplastic Polyesters, Ed. S. Fakirov, Wiley-VCH, 2002". Examples are polyesters comprised of ethylene glycol and terephthalic acid (=polyethylene terephthalate, PET), of ethylene glycol and naphthalene-2,6-dicarboxylic acid (=polyethylene 2,6-naphthalate, PEN) and of 1,4-bishydroxymethylcyclohexane and terephthalic acid (=poly(1,4-cyclohexanedimethylene terephthalate), PCD).

The production process for polyester films is described, for example, in the "Handbook of Thermoplastic Polyesters, Ed. S. Fakirov, Wiley-VCH, 2002" or in the chapter "Polyesters, Films" in the "Encyclopedia of Polymer Science and Engineering, Vol. 12, John Wiley & Sons, 1988". In the preferred extrusion process for producing the film, the molten polymer material is extruded, optionally with the additives, through a slot die and quenched on a chill roll as a substantially amorphous prefilm. This film is subsequently reheated and oriented in at least one direction, either in machine direction (MD) or in transverse direction (TD), but preferably in longitudinal and transverse direction or in transverse and longitudinal direction, or in longitudinal, in transverse and once again in longitudinal direction and/or transverse direction. The film temperatures in the stretching process are generally from 10 to 60° C. above the glass transition temperature Tg of the polyester used; the stretching ratio of the longitudinal stretching is typically from 2.0 to 6.0, in particular from 3.0 to 4.5, that of the transverse stretching is from 2.0 to 5.0, in particular from 3.0 to 4.5, and that of the optionally performed second longitudinal and transverse stretching from 1.1 to 5.0. The longitudinal stretching may also be carried out simultaneously with the transverse stretching (simultaneous stretching) or in any conceivable sequence. This is followed by heat-setting of the film at oven temperatures of from 180 to 260° C., in particular from 220 to 250° C. Subsequently, the film is cooled and wound up.

The table which follows once again summarizes the most important inventive properties of the coating:

TABLE

| Coating components | Inventive range | Preferred | Unit |
| --- | --- | --- | --- |
| Polyvinylpyrrolidone, proportion | 0.3 to 4.0 | 0.5 to 3.5 | % by wt. |

TABLE-continued

| Coating components | Inventive range | Preferred | Unit |
|---|---|---|---|
| Polyvinylpyrrolidone, $M_w$ | 20 to 2500 | 40 to 1500 | kdaltons |
| Surfactant, proportion | 0.1 to 2.5 | 0.3 to 2.0 | % by wt. |
| Optional polymer, proportion | 0.3 to 4.0 | 0.5 to 3.5 | % by wt. |
| Thickness of the coating | 5 to 500 | 30 to 200 | nm |

In order to test the effectiveness of the coatings, polyester films were coated and these were characterized by the following test methods.

The surface tension of the films is so high (>70 mN/m) that it cannot be measured by the contact angle method, since the water drop is very flat.

Determination of the Antifog Action

The antifog properties of the polyester films were determined as follows:

In a laboratory climate-controlled at 23° C. and 50% relative atmospheric moisture, film specimens were welded to a meal tray (length approx. 17 cm, width approx. 12 cm, height approx. 3 cm) made of amorphous polyethylene terephthalate, which contained approx. 50 ml of water.

The trays were stored in a refrigerator controlled at 4° C. and were taken out for assessment after 10 min, 30 min, 4 h, 8 h and 24 h. The condensate formation on cooling of the air at 23° C. to refrigerator temperature was tested. A film equipped with an effective antifog composition is transparent even after condensate formation, since the condensate, for example, forms a coherent, transparent film. Without effective antifog composition, the formation of a fine droplet mist on the film surface leads to reduced transparency of the film; in the most unfavorable case, the contents of the tray are no longer visible.

A further investigation method is what is known as the hot fog test. For this test, a 250 ml beaker which contains 50 ml of water and over which is stretched the film to be tested is placed in a water bath heated to 70° C. (ambient temperature 23° C.). The assessment is the same as described above. In addition, this test can be used to test the long-term antifog action and the washout stability of the film, since the vapor condenses constantly on the film and runs off or drips off again. Readily soluble substances are thus washed out and the antifog action declines.

Measurement of Transparency and Opacity

The measurement on the coated polyester films is effected on the Hazegard Hazemeter XL-211 from BYK Gardner based on ASTM-D 1033-77 for transparency and on ASTM-D 1003-61 for opacity.

The invention will be illustrated in detail below with reference to examples.

EXAMPLE 1

To produce the coating solution, the following components were dissolved in water:
2.0% by weight of polyvinylpyrrolidone (LUVITEC® K30; BASF AG, Mw~50 kdaltons)
1.0% by weight of diethylhexyl sulfosuccinate sodium salt (LUTENSIT® A-BO; BASF AG).

(The % by weight are based on the finished coating solution)

This coating solution was applied to polyester film by the following process:

A melt was produced from polyethylene terephthalate and was extruded through a slot die onto a casting roll kept at about 20° C., where it solidified to give an unoriented film. The unoriented film was stretched longitudinally in a stretching ratio of 3.8:1, in the course of which it was kept at a temperature of 115° C. The longitudinally stretched film was corona-treated in a corona discharge unit and then coated by reverse gravure coating with the above-described solution of polyvinylpyrrolidone and diethylhexyl sulfosuccinate sodium salt. The longitudinally stretched, corona-treated film was dried at a temperature of 100° C. The film was then stretched transversely in a stretching ratio of 3.8:1, so as to obtain a biaxially stretched film. The biaxially stretched film was heat-set at 230° C. The end film thickness was 25 μm. The dry weight of the coating was approx. 0.04 g/m².

The film exhibited very good antifog properties, i.e. the formation of fine droplets was not observed; at the same time, the washout resistance of the coating was good. The transparency and the opacity of the film remained unchanged in the antifog test.

EXAMPLE 2

Analogously to example 1, the following composition of the coating solution was used:
2.0% by weight of polyvinylpyrrolidone (LUVITEC® K30; BASF AG, Mw~50 kdaltons)
1.0% by weight of acrylate copolymer consisting of 60% by weight of methyl methacrylate, 35% by weight of ethyl acrylate and 5% by weight of N-methylolacrylamide
1.0% by weight of diethylhexyl sulfosuccinate sodium salt (LUTENSIT® A-BO BASF AG).

The dry weight of the coating was approx. 0.04 g/m² at a thickness of the carrier film of approx. 50 μm.

Like example 1, this film also exhibited very good antifog properties; at the same time, the washout resistance of the coating was improved, i.e. the antifog properties were retained even after several hours of treatment with steam. The transparency and the opacity of the film remained unchanged in the antifog test.

EXAMPLE 3

Analogously to example 1, the following composition of the coating solution was used:
1.5% by weight of polyvinylpyrrolidone (LUVITEC® K60; BASF AG, Mw~450 kdaltons)
1.0% by weight of copolymer of acrylic acid and maleic acid (Aldrich, Mw~3 kdaltons)
1.0% by weight of lauryl sulfate sodium salt.

The dry weight of the coating was approx. 0.06 g/m² at a thickness of the carrier film of approx. 12 μm.

The film exhibited very good antifog properties; at the same time, the washout resistance of the coating was very good. The transparency and the opacity of the film remained unchanged in the antifog test.

COMPARATIVE EXAMPLE

Analogously to example 1, a biaxially oriented polyester film was produced, but without coating.

In the antifog test, the film exhibited a high degree of droplet formation, i.e. the film did not have an antifog effect.

What is claimed is:

1. A hydrophilic antifogging coating composition consisting essentially of (i) water,
(ii) polyvinyl pyrrolidone and
(iii) a surfactant,
said coating composition further optionally comprising
(iv) an adhesion-promoting polymer selected from the group consisting of acrylate, polyurethane, and a butadiene copolymer with acrylonitrile or methyl methacrylate, methacrylic acid or an ester thereof and
(v) one or more antiblocking agents.

2. The hydrophilic coating composition as claimed in claim 1, wherein the surfactant is an ionic surfactant.

3. The hydrophilic coating composition as claimed in claim 2, wherein the surfactant is an anionic surfactant selected from the group consisting of alkylsulfates, alkylbenzenesulfates, alkyl ether sulfates or sulfosuccinic esters.

4. The hydrophilic coating composition as claimed in claim 1, wherein said optional adhesion-promoting polymer which binds the polyvinylpyrrolidone to polymer surfaces is present within said coating.

5. The hydrophilic coating composition as claimed in claim 4, wherein the adhesion-promoting polymer is present in the composition in an amount of from 0.3 to 4.0% by weight (based on the weight of the aqueous costing composition).

6. The hydrophilic coating composition as claimed in claim 1, wherein said optional antiblocking agent is present within said coating and the antiblocking agent comprises inorganic and/or organic particles.

7. The hydrophilic coating composition claimed in claim 1, wherein the polyvinylpyrrolidone has a molecular weight of from 20 to 2500 kDa.

8. The hydrophilic coating composition claimed in claim 1, wherein the polyvinylpyrrolidone is present in the composition in an amount of from 0.3 to 4.0% by weight (based on the weight of the aqueous coating composition).

9. The hydrophilic coating composition claimed in claim 1, wherein the surfactant is present in the composition in an amount of from 0.1 to 2.5% by weight (based on the weight of the aqueous coating composition).

10. A hydrophilically coated polyester film comprising a polyester film and a hydrophilic coating on one or both sides, wherein the coating is the drying product of a hydrophilic coating composition claimed in claim 1.

11. The polyester film claimed in claim 10, said film comprising a single-layer structure.

12. The polyester film as claimed in claim 10, which his a two-layer or multilayer structure.

13. The polyester film as claimed in claim 10, said film exhibiting a total thickness of from 5 to 500 µm.

14. The polyester film as claimed in claim 10, wherein the hydrophilic coating has a thickness of from 5 to 500 nm.

15. The polyester film as claimed in claim 10, wherein said film is transparent, white, opaque, glossy or matt.

16. The polyester film as claimed in claim 10, wherein said film has been biaxially oriented.

17. Food packaging comprising a hydrophilically coated polyester film as claimed in claim 10.

18. Medical diagnostic aids comprising a hydrophilically coated polyester film as claimed in claim 10.

19. A process for producing a hydrophilically coated polyester film, said process comprising melting polyester chips in an extruder, extruding the melted chips through a slot die, cooling the melted chips on a chill roll, stretching, heat-setting and winding up the cooled extrudite, said process further comprising coating the film with a hydrophilic coating composition as claimed in claim 1 after the film has been cooled on the chill roll and before it has been wound up.

20. The process as claimed in claim 19, further comprising subjecting the polyester film to a corona treatment before it is coated with the hydrophilic coating composition.

21. The process as claimed in claim 19, further comprising applying the hydrophilic coating composition to the polyester film using one or more reverse gravure rolls.

22. A polymeric surface comprising the hydrophilic coating composition as claimed in claim 1.

23. Polymeric spectacle glass comprising the hydrophilic coating composition as claimed in claim 1.

24. A hydrophilic antifogging coating composition as claimed in claim 1, wherein said coating composition comprises polyvinyl pyrrolidone, a surfactant, and an adhesion promoting polymer, and
said polyvinyl pyrrolidone has a molecular weight ranging from 20 to 450 kdaltons and said adhesion promoting polymer includes comonomer selected from N-methylolacrylamide and corresponding ethers;
or said polyvinyl pyrrolidone has a molecular weight ranging from 450 to 2500 kdaltons and said adhesion promoting polymer includes conomonomers selected from carboxyl containing monomers, anhydrides, hydroxyl containing monomers, and amides.

25. A biaxially oriented polyester film comprising a single coating composition, wherein said single coating is a hydrophilic antifogging coating consisting essentially of (i) polyvinyl pyrrolidone, (ii) a surfactant, (iii) hydrophilic polyester and, optionally, (v) one or more antiblocking agents, wherein said polyvinyl pyrrolidone and surfactant are present in a weight ratio ranging from 1.5:1 to 2:1 and the surface tension of said film is greater than 70 mN/m.

* * * * *